(12) United States Patent
Wei et al.

(10) Patent No.: US 11,732,956 B2
(45) Date of Patent: Aug. 22, 2023

(54) REFRIGERATOR HAVING WIRING MECHANISM

(71) Applicants: QINGDAO HAIER REFRIGERATOR CO., LTD., Qingdao (CN); HAIER SMART HOME CO., LTD., Qingdao (CN)

(72) Inventors: Dong Wei, Qingdao (CN); Jian Zhang, Qingdao (CN); Ning Wang, Qingdao (CN); Guangrui Wu, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 123 days.

(21) Appl. No.: 17/427,656

(22) PCT Filed: Jan. 15, 2020

(86) PCT No.: PCT/CN2020/072154
§ 371 (c)(1),
(2) Date: Aug. 1, 2021

(87) PCT Pub. No.: WO2020/164357
PCT Pub. Date: Aug. 20, 2020

(65) Prior Publication Data
US 2022/0128295 A1    Apr. 28, 2022

(30) Foreign Application Priority Data

Feb. 12, 2019   (CN) .......................... 201910111421.4
Feb. 12, 2019   (CN) .......................... 201910111422.9
(Continued)

(51) Int. Cl.
F25D 25/02        (2006.01)
F25D 23/02        (2006.01)
(Continued)

(52) U.S. Cl.
CPC ............ *F25D 25/025* (2013.01); *A47B 88/40* (2017.01); *A47B 88/457* (2017.01);
(Continued)

(58) Field of Classification Search
CPC .. F25D 25/025; F25D 2400/40; F25D 23/021; A47B 88/457; A47B 88/40; A47B 2210/175
See application file for complete search history.

(56) References Cited

U.S. PATENT DOCUMENTS 8,434,837 B2 *  5/2013  Lee ........................ H02K 7/116
                                                    312/402
9,585,474 B2 *  3/2017  Haltmeyer ............. A47B 88/49
(Continued)

FOREIGN PATENT DOCUMENTS

CN        101949628 A      1/2011
CN        105300021 A      2/2016
CN        106871529 A      6/2017

*Primary Examiner* — Kimberley S Wright
(74) *Attorney, Agent, or Firm* — Cheng-Ju Chiang

(57) ABSTRACT

A refrigerator has a wiring mechanism. The refrigerator comprises a cabinet and a drawer-type door body, wherein the cabinet forms a compartment provided with an opening facing forward, and the drawer-type door body is provided with an electrical component. The wiring mechanism comprises a cable for supplying power to the electrical component, and a drag chain for accommodating part of the cable, wherein one end of the drag chain is fixed inside the compartment, and the other end of the drag chain is connected to the drawer-type door body and moves forward and backward along with the drawer-type door body, thereby preventing the cable from being deformed and damaged, and ensuring a reliable electrical connection.

14 Claims, 6 Drawing Sheets

(30) Foreign Application Priority Data

| Feb. 12, 2019 | (CN) | 201910111511.3 |
| Feb. 12, 2019 | (CN) | 201910111528.9 |
| Feb. 12, 2019 | (CN) | 201910111529.3 |
| Feb. 12, 2019 | (CN) | 201910111574.9 |
| Feb. 12, 2019 | (CN) | 201910111730.1 |
| Feb. 12, 2019 | (CN) | 201910111736.9 |
| Feb. 12, 2019 | (CN) | 201910111739.2 |
| Feb. 20, 2019 | (CN) | 201910111741.X |

(51) Int. Cl.
*A47B 88/457* (2017.01)
*A47B 88/40* (2017.01)
*F16G 13/16* (2006.01)
*H02G 11/00* (2006.01)

(52) U.S. Cl.
CPC ...... *F25D 23/021* (2013.01); *A47B 2210/175* (2013.01); *F16G 13/16* (2013.01); *F25D 2400/40* (2013.01); *H02G 11/006* (2013.01)

(56) References Cited

U.S. PATENT DOCUMENTS

| 11,408,669 | B2* | 8/2022 | Yang | F25D 25/025 |
| 2006/0097611 | A1 | 5/2006 | Kim et al. | |
| 2011/0005264 | A1* | 1/2011 | Lee | F25D 23/021 |
| | | | | 62/449 |
| 2011/0181163 | A1* | 7/2011 | Han | F25D 23/065 |
| | | | | 312/405 |
| 2014/0319990 | A1 | 10/2014 | Gephart et al. | |
| 2015/0022072 | A1* | 1/2015 | Haltmeyer | F25D 25/025 |
| | | | | 29/869 |
| 2015/0069899 | A1* | 3/2015 | Han | F25D 11/00 |
| | | | | 312/405 |
| 2021/0190415 | A1* | 6/2021 | Yang | F25D 29/005 |

\* cited by examiner

REFRIGERATOR HAVING WIRING MECHANISM

CROSS REFERENCE TO RELATED APPLICATIONS

The present application is a 35 U.S.C. § 371 National Phase conversion of International (PCT) Patent Application No. PCT/CN2020/072154, filed on Jan. 15, 2020, which claims priority of Chinese Patent Application No. 201910111730.1, filed on Feb. 12, 2019, Chinese Patent Application No. 201910111511.3, filed on Feb. 12, 2019, Chinese Patent Application No. 201910111574.9, filed on Feb. 12, 2019, Chinese Patent Application No. 201910111421.4, filed on Feb. 12, 2019, Chinese Patent Application No. 201910111422.9, filed on Feb. 12, 2019, Chinese Patent Application No. 201910111741.X, filed on Feb. 12, 2019, Chinese Patent Application No. 201910111736.9, filed on Feb. 12, 2019, Chinese Patent Application No. 201910111739.2, filed on Feb. 12, 2019, Chinese Patent Application No. 201910111529.3, filed on Feb. 12, 2019, Chinese Patent Application No. 201910111528.9, filed on Feb. 12, 2019, the disclosure of which is incorporated by reference herein. The PCT International Patent Application was filed and published in Chinese.

TECHNICAL FIELD

The present invention relates to the technical field of refrigeration devices, and particularly to a refrigerator having a wiring mechanism.

BACKGROUND

At present, higher demands is raised for aspects such as the volume, appearance and operating convenience of refrigerator products in domestic and foreign markets. A touch display screen or other electrical components are disposed on door bodies of more and more refrigerators to enhance the appearance of the refrigerators and achieve corresponding functions. As for a conventional pivotal door body, a corresponding cable is mostly disposed in a hinge shaft to achieve electrical power transmission on the door body; as for a drawer-type door body, a cable that is movable along with the pushing and pulling of the drawer-type door body needs to be provided to achieve power supply to the above-mentioned electrical components. Since a gap between the drawer box and the inner wall of the cabinet is small, the cable is liable to entangle and wear with other components, even break and fail.

To solve the above problem, this field is already disclosed a solution in which a linkage assembly is disposed between the cabinet of the refrigerator and the drawer-type door body, and the cable is connected to the door body from the cabinet along the corresponding linkage assembly. However, the cable is subjected to a large stress at a position where the linkage assembly itself bends and deforms, and wear and failure might occur to the linkage assembly itself upon repeated operation, which affects the experience in operating the drawer-type door body. This field is also disclosed a wiring mechanism in which a fixed frame and a support frame are disposed on an inner wall of the cabinet and on a rear side of the door body, respectively, a guide hole is formed on the fixed frame, the cable extends between the fixed frame and the inner wall through the guide hole into the compartment, and then extends through a wire box fixed on the support frame towards the drawer-type door body. It is still difficult for the wiring mechanism to form effective limitation and constraint of a movable portion of the cable. This portion of cable is still likely to interfere with the slide rail or other components, and is therefore subjected to press and wear, which affects the operation of the electrical components on the drawer-type door body.

In view of this, it is necessary to provide a novel refrigerator having a wiring mechanism.

SUMMARY

An object of the present invention is to provide a refrigerator having a wiring mechanism, which can better prevent the cable from damages, and is pleasant in structure and reliable in operation.

To achieve the above object of the present invention, the present invention provide a refrigerator having a wiring mechanism, comprising a cabinet and a drawer-type door body, the cabinet being formed with a compartment opening forwards, the drawer-type door body being movable in a front-rear direction to open or close the compartment, the drawer-type door body being provided with an electrical component, wherein the wiring mechanism comprises a cable for powering the electrical component, and a drag chain for receiving part of the cable, one end of the drag chain is fixed to an interior of the compartment, and the other end of the drag chain is connected to the drawer-type door body and moves back and forth along with the drawer-type door body.

Optionally, wherein the drag chain is bent and folded in a height direction.

Optionally, wherein the wiring mechanism further comprises a mounting box fixed in the compartment, and the mounting box is disposed adjacent to the front opening of the compartment; an end of the drag chain is connected to a rear side of the mounting box in the front-rear direction.

Optionally, wherein the cable extends into the mounting box, one end of the cable corresponding to the mounting box is provided with a first connector located in the mounting box, and a limiting member for limiting movement of the cable is disposed in the mounting box.

Optionally, wherein the wiring mechanism further comprises a support frame fixed to a rear side of the drawer-type door body, and the other end of the drag chain is connected to the support frame.

Optionally, wherein the wiring mechanism further comprises a fixed box fixed on the support frame, and the other end of the drag chain is connected to the rear side of the fixed box in the front-to-rear direction.

Optionally, wherein the fixed box is formed with a receiving cavity, and a second connector fixedly received in the receiving cavity is disposed at an end of the cable facing towards the fixed box.

Optionally, wherein the support frame is formed with a mounting portion for mounting the fixed box, the mounting portion is provided with first catch orifices, and the fixed box is formed with fixed block mated and fixed with the first catch orifices; the fixed blocks are disposed offset from the receiving cavity.

Optionally, wherein the support frame protrudes to form a support protrusion for limiting the droop of the drag chain.

Optionally, wherein the compartment has two oppositely-disposed side walls; the wiring mechanism comprises a fixed frame mounted on the side wall and a slide rail assembly disposed between the support frame and the fixed frame, the slide rail assembly comprises a fixed rail fixed on the fixed frame and a movable rail fixed with the support frame.

Optionally, wherein the wiring mechanism further comprises a support frame fixed on a rear side of the drawer-type door body, the support frame is provided with a fixed box, and the fixed box is formed with a first plugging interface; the wiring mechanism further comprises a mounting box fixed in the compartment, and the mounting box is formed with a second plugging interface; both ends of the drag chain are respectively inserted in the first plugging interface and the second plugging interface.

Optionally, wherein the drag chain comprises a plurality of chain links connected in sequence, the chain links each have two clamping plates arranged opposite to each other in a left-right direction, and both ends of each of the clamping plates are respectively formed with a connecting hole and a connecting post; the fixed box comprises a top wall and a bottom wall arranged vertically opposite to each other, a connecting wall connecting the top wall with the bottom wall, and a retaining wall opposite to the connecting wall, the first plugging interface is formed in between the connecting wall and the retaining wall, the connecting wall and the retaining wall are formed with a set of oppositely-disposed plugging bosses, and the plugging bosses each are provided with a plugging hole that mates with the connecting post; the plugging bosses each are further formed with a guide surface extending obliquely.

Optionally, wherein the drag chain comprises a plurality of chain links connected in sequence, the chain links each have two clamping plates arranged opposite to each other in a left-right direction, and both ends of each of the clamping plates are respectively formed with a connecting hole and a connecting post; the mounting box comprises a front wall and a rear wall which are arranged oppositely, and a cover plate connected between the front wall and the rear wall, the rear wall extends forward to form an cooperation plate disposed opposite to the cover plate, the second plugging interface is formed between the cover plate and the cooperation plate, the cover plate and the cooperation plate are formed with a pair of plugging posts opposite to each other in the left-right direction, and the plugging posts engage with the connecting holes to achieve connection of the drag chain and the mounting box; the plugging posts each are further formed with a guide surface extending obliquely.

Optionally, wherein the first plugging interface is formed at a rear end of the fixed box, the second plugging interface is formed at a rear end of the mounting box, and the first plugging interface is higher than the second plugging interface.

Optionally, wherein the first plugging interface and the second plugging interface are respectively formed with a limiting protrusion.

The present invention has the following advantages: the cable can be effectively protected by the drag chain whose both ends are connected to the interior of the compartment and the drawer-type door body, respectively, and the cable can be prevented from being subjected to pressing and deformation; the drag chain can control the bending degree of the cable, avoid the loss of stress caused by excessive bending and deformation, improve the service life of the cable, ensure normal operation of the electrical components on the drawer-type door body, and present more pleasant structural design.

DETAILED DESCRIPTION

The present invention will be described in detail in conjunction with embodiments shown in the figures. However, these embodiments are not intended to limit the present invention. Structural, methodological or functional variations made by those having ordinary skill in the art according to these embodiments are all comprised in the extent of protection of the present invention.

Figure 1:
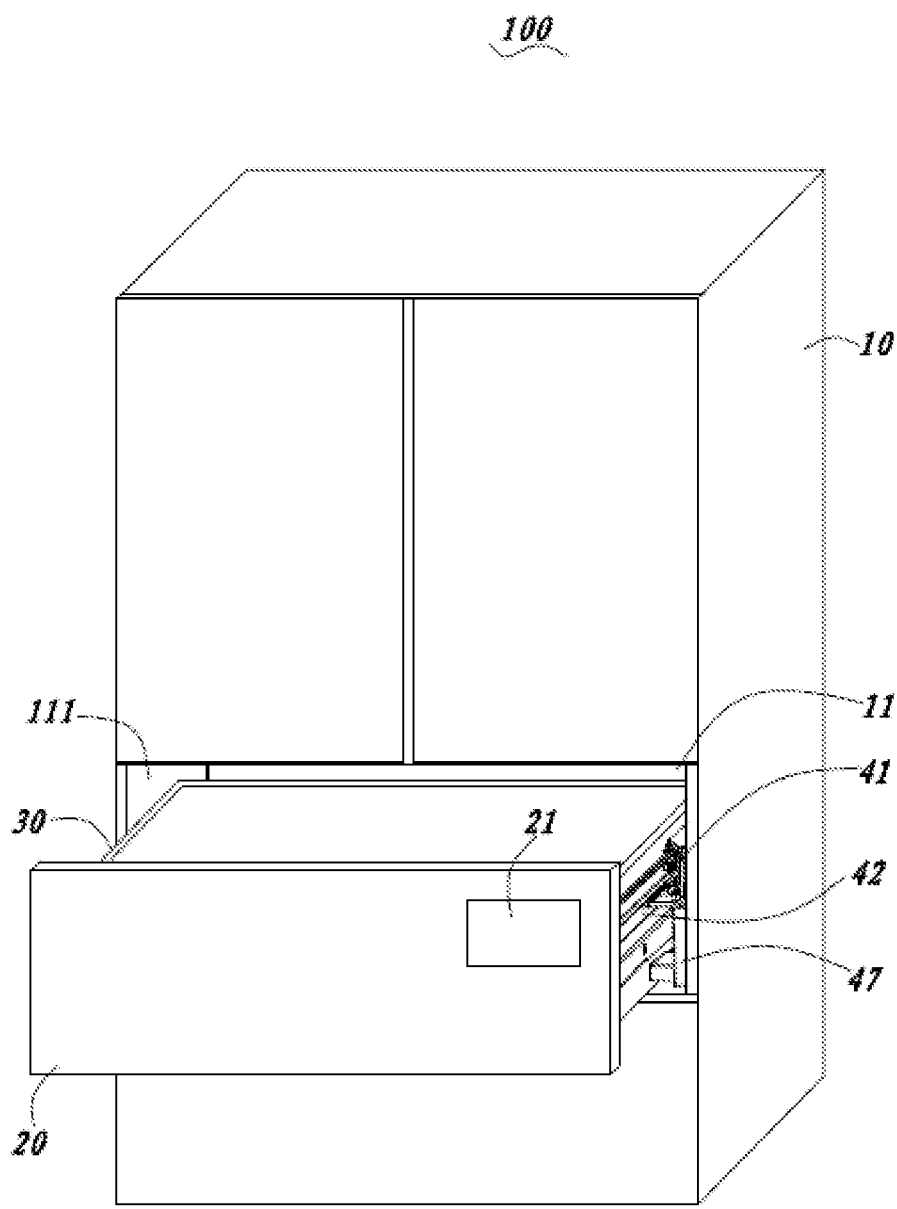
FIG. 1 is an overall schematic view of a refrigerator according to the present invention.

Referring to FIG. 1, a refrigerator 100 according to the present invention comprises a cabinet 10 and a drawer-type door body 20 disposed on a front side of the cabinet 10, the cabinet 10 forming a compartment 11 which is open forwards; the drawer-type door body 20 may move back and forth to open or close the compartment 11.

The compartment 11 has two side walls 111 opposite to each other; the drawer-type door body 20 is provided with an electrical component, which may be a touch screen 21. A rear side of the drawer-type door body 20 is provided with a drawer box 30 for storing items. The drawer box 30 moves together with the drawer-type door body 20, and the drawer box 30 is preferably detachably disposed, i.e., after the drawer-type door body 20 is opened, the drawer box 30 can be taken out individually.

Figure 2:
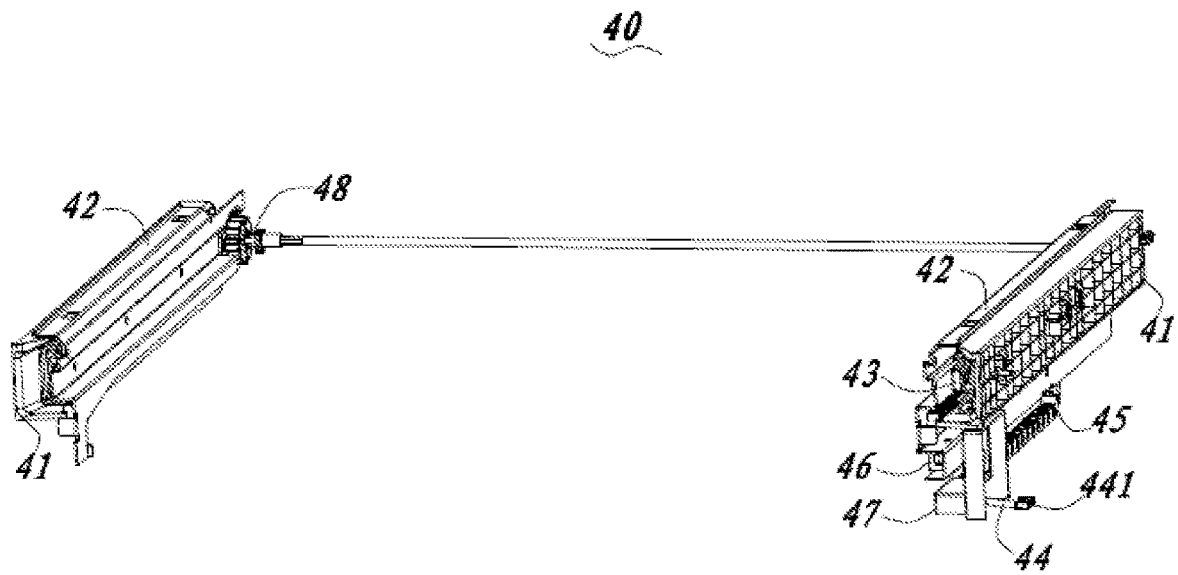
FIG. 2 is a structural schematic view of a wiring mechanism of the refrigerator according to the present invention.
Figure 3:
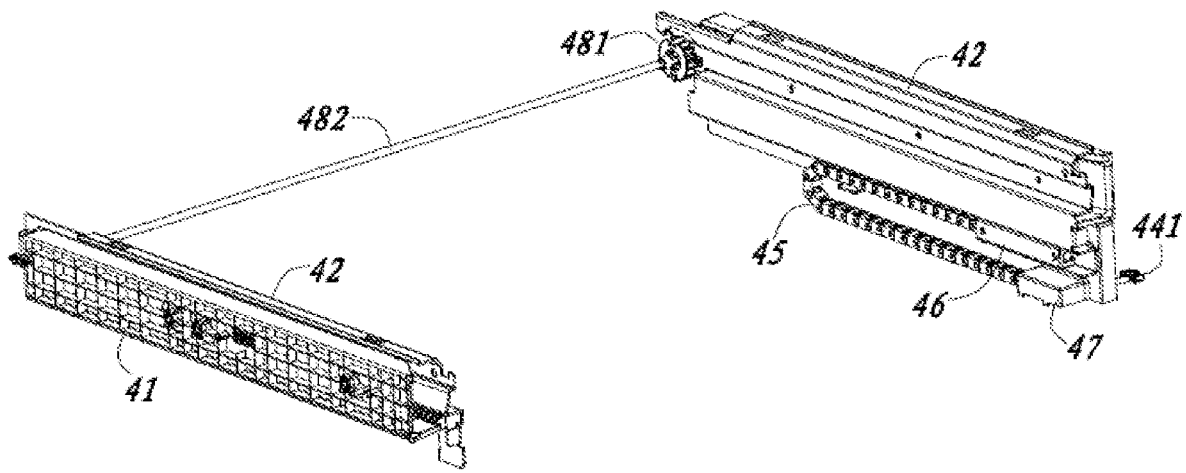
FIG. 3 is a structural schematic view of the wiring mechanism of FIG. 2 as viewed from another perspective.

As shown in FIG. 2 and FIG. 3, the refrigerator 100 further comprises a wiring mechanism 40 for achieving electrical connection of the drawer-type door body 20 with the cabinet 10. The wiring mechanism 40 comprises a fixed frame 41 mounted in the compartment 11, a support frame 42 fixed on the rear side of the drawer-type door body 20, and a slide rail assembly 43 disposed between the support frame 42 and the fixed frame 41. In other words, the wiring mechanism 40 is further used to realize the front-back movement of the drawer-type door body 20 and the drawer box 30 relative to the compartment 11. The fixed frames 41 are arranged as a set opposite to each other in a left-right direction and fixedly mounted on the aforementioned two side walls 111 of the compartment 11, respectively; the support frames 42 are also arranged as a set and slidably connected with the fixed frames 41 via respective slide rail assemblies 43, and the support frames 42 are used to carry the drawer box 30; the slide rail assembly 43 comprises a fixed rail fixed on the side wall 111 and a movable rail movable back and forth relative to the fixed rail.

Figure 4:
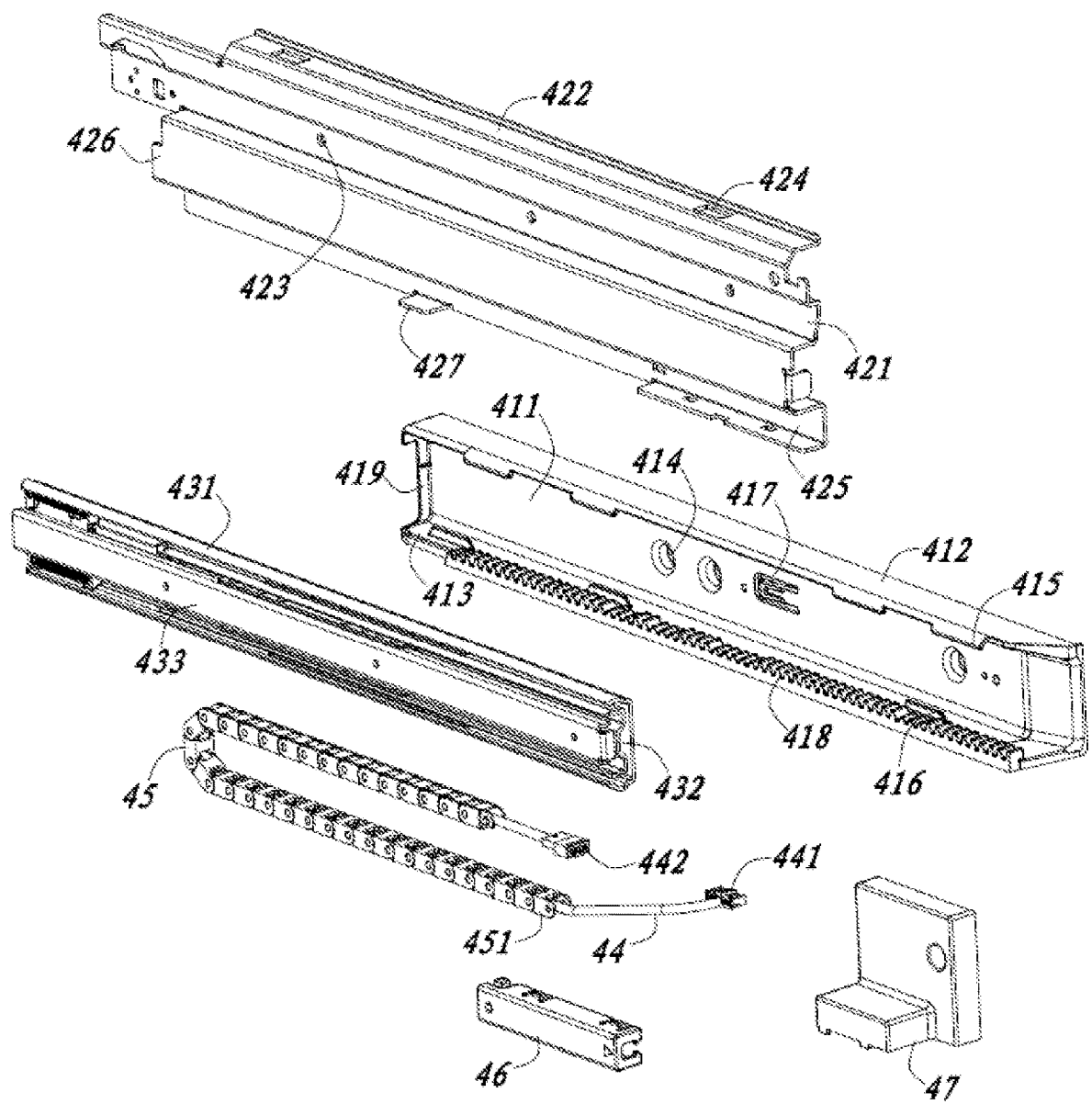
FIG. 4 is an exploded view of partial structures of the wiring mechanism of the refrigerator according to the present invention.

As shown in FIG. 4, the slide rail assembly 43 is preferably configured as a three-stage slide rail, and the slide rail assembly 43 comprises a first slide rail 431 fixed to a side of the fixed frame 41 facing towards the interior of the compartment 11, a second slide rail 432 slidably fitting with the first slide rail 431, and a third slide rail 433 slidably fitting with the second slide rail 432 and fixed to the support frame 42. Here, the first slide rail 431 is the aforementioned fixed rail; the third slide rail 433 is the aforementioned moveable rail.

The wiring mechanism 40 further comprises a cable 44 for supplying power to the touch screen 21 and a drag chain 45 for accommodating part of the cable 44. A first connector 441 and a second connector 442 are respectively connected to both ends of the cable 44, the first connector 441 is used to mate with a cabinet-side electrical connector (not shown) in the compartment 11, and the second connector 442 is used to mate with a door body-side electrical connector (not shown) connected to the electrical component. One end of the drag chain 45 is fixed inside the compartment 11, the other end of the drag chain 45 is connected to the drawer-type door body 20 and moves back and forth along with the drawer-type door body 20, and the other end of the drag chain 45 is connected to the aforementioned support frame 42. In actual production, the drag chain 45 may be directly fixed to a predetermined position of the support frame 42 by screws, etc., or a fixing structure adapted for the end of the drag chain 45 may be formed on the support frame 42 to achieve the affixation and installation of the drag chain 45 and the fixed frame 42. Preferably, the drag chain 45 is connected to the side of the support frame 42 facing towards the interior of the compartment 11.

Here, the wiring mechanism 40 further comprises a fixed box 46 mounted on the support frame 42 and a mounting box 47 mounted in the compartment 11, and the rear end of the drag chain 45 is connected to the mounting box 47, and the front end of the drag chain 45 is connected to the rear side of the fixed box 46. It should be noted that the rear end and the front end of the drag chain 45 are not limitations of both ends of the drag chain 45 in a strict sense, but definitions made for ease of description. In other words, while the drawer-type door body 20 moves, the front end of the drag chain 45 may be located behind the rear end of the drag chain 45.

The fixed frame 41 comprises a main body portion 411 abutting against the side wall 111, a first extension portion 412 and a second extension portion 413 formed by folding and extending from upper and lower side edges of the main body portion 411 toward the interior of the compartment. The main body portion 411 is provided with at least two spaced-apart fixing holes 414 to realize the affixation and installation of the fixed frame 41 and the side wall 111; the first extension portion 412 and the second extension portion 413 protrude vertically towards each other to form a first holding arm 415 and a second holding arm 416 for holding the first slide rail 431, and the main body 411 is further formed with a limiting arm 417 extending obliquely from front to back to prevent the first slide rail 431 from forward play after the assembling is complete.

In addition, a surface of an upward side of the second extension portion 413 is further formed with a rack 418 extending back and forth, and the rack 418 is located on a side of the second holding arm 416 away from the main body portion 411. The wiring mechanism 40 further comprises a balance assembly 48, which comprises a pair of gears 481 respectively rotatably connected to the rear ends of the two support frames 42, and the pair of gears 481 are arranged opposite to each other in the left-right direction and may roll back and forth along the rack 418. The balance assembly 48 further comprises a balance rod 482 extending horizontally from left to right and connected between the pair of gears 481. When the drawer-type door body 20 pushes and pulls the support frame 42 to move back and forth, the balance assembly 48 may ensure that support frames 42 opposed in the left-right direction move synchronously, and the operation is smoother. In addition, the rear end of the fixed frame 41 is further formed with a stop portion 419 to prevent the slide rail assembly 43 from going beyond a predetermined position when assembled from front to back; furthermore, the front end of the fixed frame 41 is further formed with a guide structure. The guide structure specifically comprises an inclined surface or a curved surface formed on the front sides of the main body portion 411, the first extension portion 412 and the second extension portion 413 and extending toward the side wall 111 corresponding to the fixed frame 41 to facilitate assembling.

Figure 5:
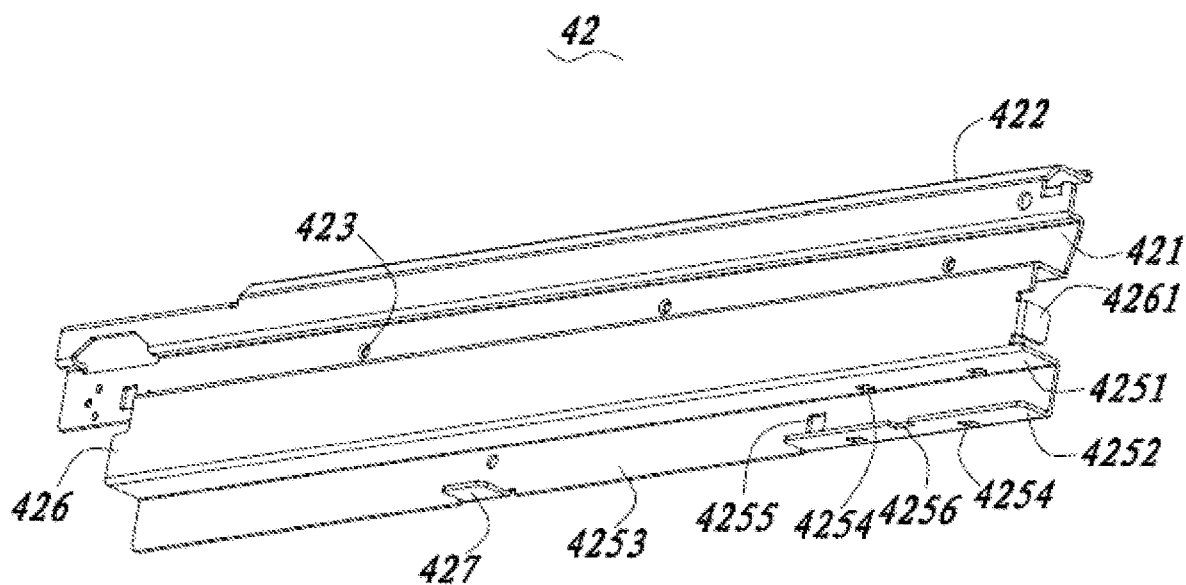
FIG. 5 is a structural schematic view of a support frame of the wiring mechanism.

Referring to FIG. 5, the support frame 42 has a fixed portion 421 fixed to the third slide rail 433, and a carrying portion 422 located above the fixed portion 421. The fixed portion 421 is provided with at least two mounting holes 423 spaced back and forth and configured to mount the third slide rail 433; the gear 481 is specifically mounted at the rear end of the fixed portion 421. The carrying portion 422 bends from the fixed portion 421 toward the interior of the compartment 11 and then extends upward to a height exceeding the height of the fixed frame 41, and then bends and extends toward the side wall 111 on which the support frame 42 is mounted to cover the fixed frame 41 below. The carrying portion 422 is further provided with a limiting hole 424 adapted for the drawer box 30, so that when the drawer box 30 is placed downward and pressed against the surface of the carrying portion 422, the position is more stable. In addition, the carrying portion 422 and the first extension portion 412 are disposed with a gap in between, thereby preventing the support frame 42 from always scratching and wearing with the fixed frame 41 during movement.

In addition, attention needs to be paid to the structural design of the support frame 42 on the side corresponding to the cable 44 and drag chain 45. The support frame 42 on this side further has a mounting portion 425 located below the fixed frame 41, and a connecting portion 426 between the fixed portion 421 and the mounting portion 425. Both the mounting portion 425 and the connecting portion 426 are also disposed with a gap with the second extension portion 413. The mounting portion 425 is disposed adjacent to the front end of the support frame 42, and the fixed box 46 is fixedly mounted on the mounting portion 425, i.e., the mutual fixation of the front end of the drag chain 45 and the support frame 42 is achieved by the fixed box 46. The front side of the connecting portion 426 bends toward the fixed frame 41 to form a folded plate 4261. The folded plate 4261 can prevent debris from falling to a certain extent and make the structure more beautiful.

The mounting portion 425 forms a mounting space that is transversely open towards the side of the interior of the compartment 11. The mounting portion 425 has a top plate 4251 and a bottom plate 4252 which are disposed vertically opposite, and a side plate 4253 connecting the top plate 4251 with the bottom plate 4252. The height between the top plate 4251 and the bottom plate 4252 matches the fixed box 46, and both the top plate 4251 and the bottom plate 4252 are provided with a first catch orifice 4254. Preferably, the top plate 4251 and the bottom plate 4252 are respectively provided with at least two first catch orifices 4254 which are disposed spaced apart back and forth. The side plate 4253 is provided with a second catch orifice 4255. The edge of the bottom plate 4252 is also recessed toward the side wall 111 corresponding to the support frame 42 to form a positioning groove 4256, which is more convenient for the installation of the fixed box 46. The front-rear extension length of the bottom plate 4252 is not less than and is approximately equal to the length of the fixed box 46, which can not only meet the stable mounting requirements of the fixed box 46, but also prevent the bottom plate 4252 from affecting the bending and deformation of the drag chain 45 connected to the fixed box 46.

Figure 6:
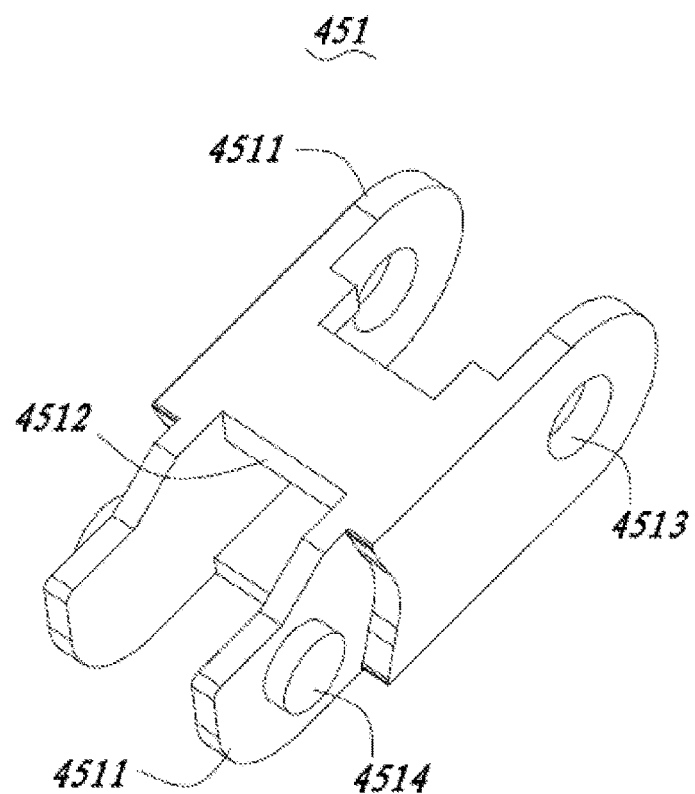
FIG. 6 is a structural schematic view of a chain link of a drag chain of the wiring mechanism.

Usually, the drag chain 45 comprises a plurality of chain links 451 connected in sequence. As shown in FIG. 6, each of said chain links 451 has two clamping plates 4511 opposite to each other, and two baffles 4512 connecting the two clamping plates 4511. The clamping plates 4511 and the baffles 4512 jointly form a cavity for receiving the cable 44. Preferably, at least one of the first connector 441 and the second connector 442 may pass through the cavity to facilitate actual production and assembling. Certainly, the size of the drag chain 45 may also be reduced, so that the cavity is adapted for the outer diameter of the cable 44, thereby improving the aesthetics of the drag chain 45 and saving installation space. However, it is necessary to first run the cable 44 into the drag chain 45, and then connect the cable to the corresponding first connector 441 and the second connector 442.

Both ends of the clamping plate 4511 are provided with a connecting hole 4513 and a connecting post 4514, respectively. The connecting hole 4513 and the connecting post 4514 respectively mate with the connecting post 4514 and the connecting hole 4513 of adjacent chain links 451 on the corresponding sides, and adjacent chain links 451 may be made rotatable relative to each other along the axial direction of the connecting hole 4513 and the connecting post 4514. Generally, the connecting hole 4513 and the connecting post 4514 are respectively set as a circular hole and a cylinder, and the distance between the two clamping plates 4511 on one side of the connecting hole 4513 is larger than the distance between the two clamping plates 4511 on one side of the connecting post 4514 to enable adjacent chain links 451 to remain movable freely.

Due to the limited space between the drawer box 30 and the side wall 111, the drag chain 45 is preferably bent and folded in the height direction, in a way that the connecting hole 4513 and the connecting post 4514 of the chain link 451 in the drag chain 45 are both disposed transversely from left to right. In the present embodiment, to reasonably reduce the installation length of the cable 44 and the drag chain 45 and the corresponding material cost, the mounting box 47 is preferably disposed at a position of the compartment 11 adjacent to the opening. Further, the mounting box 47 is located below the fixed frame 41 and disposed with a gap with the support frame 42.

The fixed box 46 is disposed adjacent to the front end of the support frame 42. In order to prevent the drag chain 45 from being exposed when the drawer-type door body 20 is opened, the side plate 4253 of the mounting portion 425 will extend backwards beyond the mounting space to the rear end of the support frame 42. Meanwhile, the support frame 42 further protrudes toward the interior of the compartment 11 to form a support protrusion 427. The support protrusion 427 is preferably disposed at an intermediate position of the support frame 42 in the front-rear direction, and the rear end of the fixed box 46 is disposed apart from the support protrusion 427. The intermediate position described here is not defined as a midpoint position of the support frame 42 in a strict sense, and it may be a position near the midpoint of the support frame 42 in the front-rear direction. When the drawer-type door body 20 is pulled out, the support protrusion 427 may prevent part of the chain links 451 of the drag chain 45 from falling downwards beyond the support frame 42, thereby affecting the appearance; when the drawer-type door body 20 retracts to the closed state, the support protrusion 427 will not affect the deformation and folding of the drag chain 45. In addition, the side plate 4253 extends rearward beyond the support protrusion 427, and the support protrusion 427 is formed by folding and extending the lower edge of the side plate 4253 toward the interior of the compartment. The support protrusion 427 is preferably provided here as a plate-like structure that may support and limit the drag chain 45. Further, the bottom plate 4252 may also be disposed to extend backwards to the vicinity of the corresponding intermediate position of the support frame 42, that is, the rear half of the bottom plate 4252 may implement the function of the support protrusion 427, whereupon the product assembly requirements may be met without additionally providing the support protrusion 427.

Figure 7:
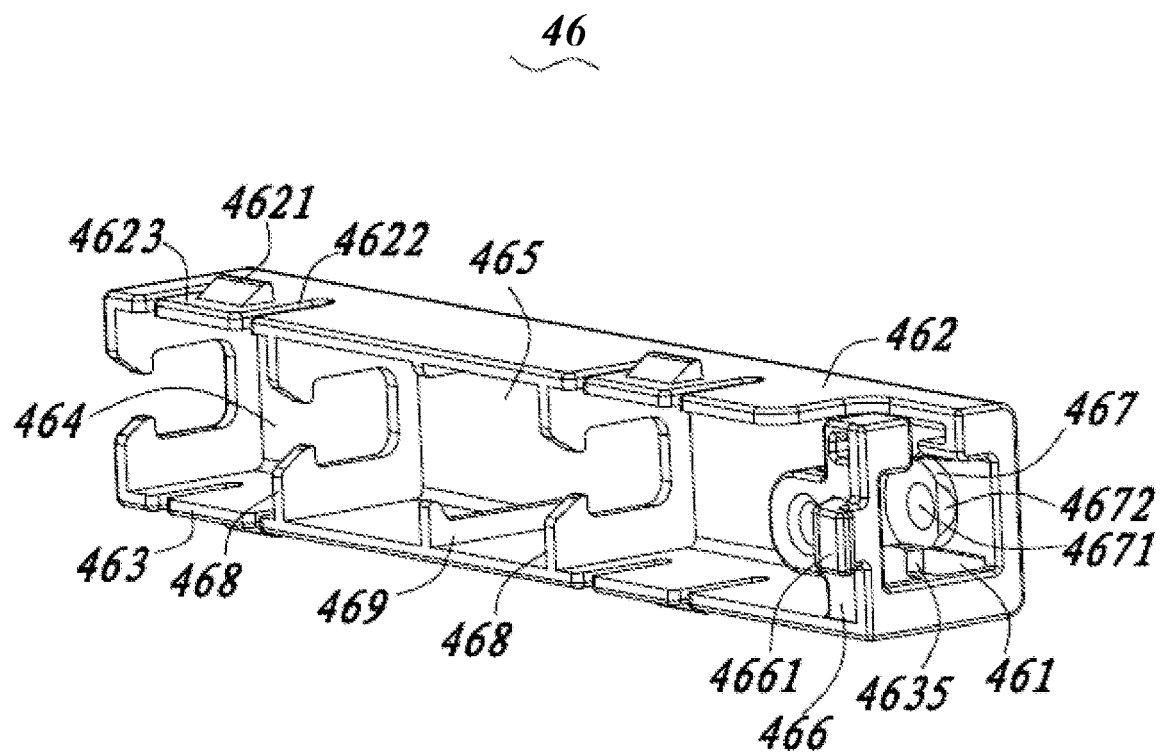
FIG. 7 is a structural schematic view of a fixed box of the wiring mechanism.
Figure 8:
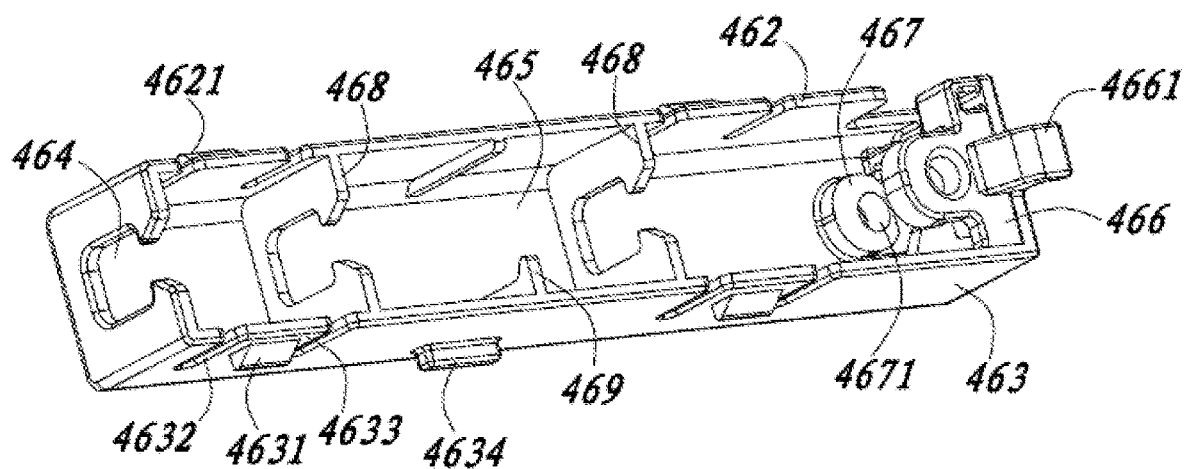
FIG. 8 is a structural schematic view of the fixed box of FIG. 7 as viewed from another perspective.

As shown in FIG. 7 and FIG. 8, the fixed box 46 and the support frame 42 are snap-fitted with each other, and the fixed box 46 is disposed transversely open towards the side of the mounting portion 425 to facilitate the installation of the second connector 442 and the door body-side electrical connector. The rear end of the fixed box 46 is provided with a first plugging interface 461. The fixed box 46 is preferably made of elastic insulating material, such as organic resin, plastic, etc., thereby facilitating the front end of the drag chain 45 to be fixed to the first plugging interface 461 in a plugging and holding manner, and meanwhile facilitating the fixation and mounting of the fixed box 46 and the support frame 42.

Specifically, the fixed box 46 comprises a top wall 462 and a bottom wall 463 arranged opposite to each other, and a connecting wall 464 connecting the top wall 462 with the bottom wall 463. An upper surface of the top wall 462 and a lower surface of the bottom wall 463 are respectively formed with fixed blocks 4621 and 4631 that mate with the first catch orifices 4254 on the top plate 4251 and the bottom plate 4252, and the fixed blocks 4621, 4631 are set in a wedge shape. During the installation of the fixed box 46, the fixed blocks 4621, 4631 are first pressed and deformed towards each other by the top plate 4251 and the bottom plate 4252, and continue to slide until the fixed blocks 4621, 4631 snap-fit with the first catch orifices 4254.

A receiving cavity 465 for receiving the second connector 442 and the door body-side electrical connector is further formed at the intermediate position of the fixed box 46 in the front-rear direction. To avoid the impact that might be caused by the fixed blocks 4621, 4631 when pressed and deformed to the receiving cavity 465, the fixed blocks 4621, 4631 are disposed offset from the receiving cavity 465 in the front-rear direction. Preferably, the fixed blocks 4621, 4631 are both provided in the number of two and are respectively located on the front and rear sides of the receiving cavity 465. Here, in order to reduce the demand for elasticity of the material of the fixed box 46 in a low-temperature environment, the top wall 462 is further formed with a first slot 4622 located beside the fixed block 4621, the first slots 4622 are provided in a group including two first slots, a first elastic wall 4623 is formed between the first slots 4622 in the same group, and the fixed block 4621 is formed protrudingly on the upper surface of the first elastic wall 4623. Likewise, the bottom wall 463 is also formed with a second slot 4632 located beside the fixed block 4631, and the fixed block 4631 is formed on a lower surface of a corresponding second elastic wall 4633.

The fixed box 46 further comprises a retaining wall 466 formed at the rear end of the top wall 462 or the bottom wall 463, the retaining wall 466 and the connecting wall 464 are disposed oppositely, and the first plugging interface 461 is formed between the retaining wall 466 and the connecting wall 464. The retaining wall 466 is formed with a retaining block 4661 backward in a direction away from the connecting wall 464. The retaining block 4661 is snap-fitted with the second catch orifice 4255 to further enhance the stability of the fixed box 46. In addition, a positioning block 4634 protruding downward is formed on the bottom wall 463 of the fixed box 46, and the positioning block 4634 may mate with the positioning groove 4256 to realize the positioning and assembling during the installation process of the fixed box 46. Certainly, the positioning groove 4256 may also be disposed at the junction of the top plate 4251 and the connecting portion 426. At this time, a corresponding positioning mechanism needs to be protrudingly provided on the top wall 462 of the fixed box 46, which will not be described in detail any more here.

The connecting wall 464 and the retaining wall 466 are oppositely formed with a plugging structure that matches the connecting hole 4513 or the connecting post 4514 of a link 451 at the front end of the drag chain 45. Here, the retaining wall 466 is fixedly connected to the bottom wall 463, and the upper end of the retaining wall 466 is disposed separate from the top wall 462, so that the first plugging interface 461 expands and deforms transversely during the plugging process of the drag chain 45 to facilitating assembling. A set of plugging bosses 467 provided oppositely are formed on the side of the connecting wall 464 and the retaining wall 466 facing towards the first plugging interface 461. A spacing between the plugging bosses 467 matches the spacing of the two opposed clamping plates 4511 in the chain link 451, the plugging boss 467 is provided with a plugging hole 4671 that mates with the connecting post 4514, and the plugging boss 467 is further formed with a guide surface extending obliquely backwards. The guide surfaces 4672 respectively formed on the set of plugging bosses 467 are arranged opposite to each other and their spacing gradually increases from front to back. The set of connecting posts 4514 on the chain link 451 first contact the guide surfaces 4672. In the forward sliding and plugging process, the connecting posts 4514 and the plugging bosses 467 press each other, and the retaining wall 466 is deformed toward the side away from the connecting wall 464. Meanwhile, the spacing of the two clamping plates 4511 of the chain link 451 also reduces until the connecting posts 4514 slide into the plugging holes 4671, the retaining wall 466 and the chain link 451 return to their respective original shapes, and the plugging of the front end of the drag chain 45 is completed. In order to avoid plug misalignment, a limiting protrusion is further formed in the first plugging interface 461. Specifically, the bottom wall 463 protrudes upward to form a first limiting protrusion 4635 at a position adjacent to the first plugging interface 461. The first limiting protrusion 4635 may abut against a baffle 4512 on the lower side of the chain link 451 to prevent the drag chain 45 from being inserted too deeply, causing the connecting post 4514 to disengage from the plugging hole 4671, and even causing the deformation and damages of the drag chain 45 or the retaining wall 466.

In addition, barrier ribs 468 are formed on the front and rear sides of the receiving cavity 465. The barrier ribs 468 may not only better ensure the structural strength of the receiving cavity 465, but also achieve effective front-rear limitation of the second connector 442 and the door body-side electrical connector received therein, avoiding front-rear displacement or disengagement of the second connector 442 and the door body-side electrical connector. The interior of the receiving cavity 465 is further formed with a raised rib 469 extending along the inner surface of the top wall 462, and/or the connecting wall 464, and/or the bottom wall 463. The raised ribs 469 may also reinforce the structure of the receiving cavity 465, and may also retain and position the second connector 442 and the door body-side electrical connector that are mated to each other.

Figure 9:
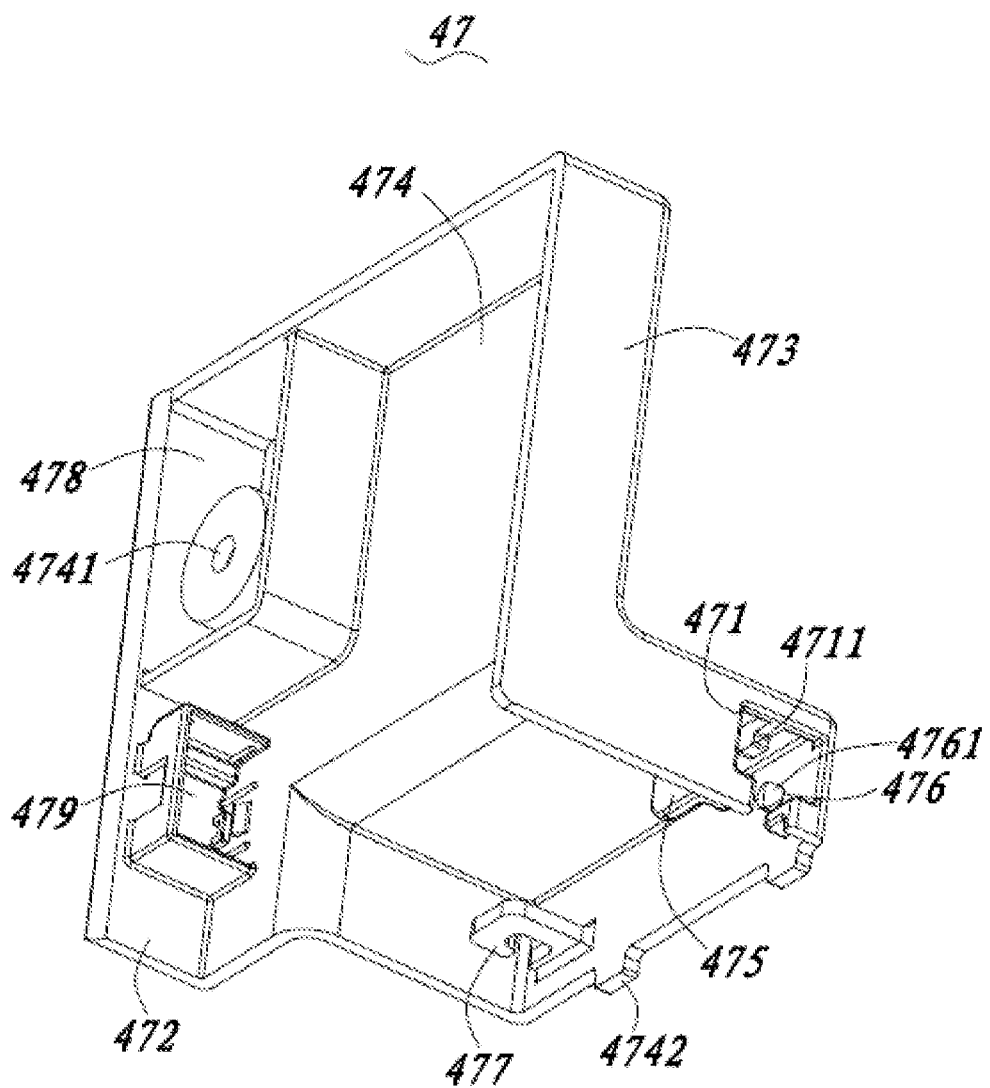
FIG. 9 is a structural schematic view of a mounting box of the wiring mechanism.

As shown in FIG. 9, the mounting box 47 is directly fixed to the side wall 111, the mounting box 47 is formed with a second plugging interface 471 that opens backward, and the second plugging interface 471 is used to engage with the rear end of the drag chain 45. Here, the mounting box 47 has a first portion located between the support frame 42 and the side wall 111 and a second portion located below the support frame 42, i.e., the cross section of the mounting box 47 in the front-rear direction is in an inverted L shape as a whole, and the second plugging interface 471 is formed at the rear end of the second portion. The cable 44 led out from the second plugging interface 471 extends backwards along with the drag chain 45 and then forwards to achieve a 180° bend and then continues to extend into the fixed box 46. The drag chain 45 itself has a minimum bending radius due to the restriction of the adjacent chain links 451, that is to say, the bending deformation angle of the cable 44 can be well defined by the drag chain 45, and the cable 44 can be avoided from excessive bending deformation and damages; the extension portion of the cable 44 between the fixed box 46 and the mounting box 47 is completely received in the drag chain 45, which can well avoid the cable 44 from play and wear due to compression.

Preferably, to reduce the stress generated by the drag chain 45 in the transverse direction, the first plugging interface 461 and the second plugging interface 471 are arranged flush with each other in the left-right direction. The first plugging interface 461 is higher than the second plugging interface 471. Furthermore, with the minimum bending radius of the drag chain 45 being taken into consideration, the height difference between the first plugging interface 461 and the second plugging interface 471 in the height direction is preferably not less than twice the minimum bending radius of the drag chain 45.

The mounting box 47 has a front wall 472 and a rear wall 473 which are arranged oppositely, and a cover plate 474 connected between the front wall 472 and the rear wall 473. The mounting box 47 is also made of an elastic insulating material. The rear wall 472 extends forward at a position adjacent to the second plugging interface 471 to form a cooperation plate 475, sides of the cooperation plate 475 and the cover plate 474 towards the second plugging interface 471 protrude towards each other to form a pair of plugging posts 476, and the plugging posts 476 engage with the connecting holes 4513 of the chain link 451 at the rearmost end of drag chain 45. The rear sides of the pair of plugging posts 476 are formed with guide surfaces 4761 that extend obliquely backward. The guide surfaces 4761 formed on the pair of plugging posts 476 respectively are arranged opposite to each other, and a spacing between the guide surfaces 4761 gradually increases from front to rear. The two clamping plates 4511 of the chain link 451 first contact the guide surfaces 4761. In the forward sliding and plugging process, the clamping plates 4511 and the plugging posts 476 press each other, and the side of the cooperation plate 475 away from the cover plate 474 deforms. Meanwhile, the spacing of the two clamping plates 4511 of the chain link 451 also reduces due to the pressing until the plugging posts 476 slide into the connecting holes 4513. At this time, the cooperation plate 475 and the chain link 451 return to their respective original shapes, and the plugging of the rear end of the drag chain 45 is completed. In order to avoid plug misalignment, a limiting protrusion is also formed in the second plugging interface 471. Specifically, the second plugging interface 471 protrudes in the vertical direction to form a second limiting protrusion 4711. The second limiting protrusion 4711 may abut against a baffle 4512 on the upper side of the chain link 451 to prevent the drag chain 45 from being inserted too deeply, causing the connecting holes 4513 to disengage from the plugging posts 476, and even causing the deformation and damages of the drag chain 45 or the cooperation plate 475.

Referring to the above depictions of the structure of the first plugging interface 461, it is conceivable that structures of the first plugging interface 461 and the second plugging interface 471 for mating with the drag chain 45 are interchangeable, that is, plugging posts (not shown) mating with the connecting holes 4513 of the chain link 451 are disposed in the first plugging interface 461, and plugging bosses and plugging holes (not shown) mating with the connecting posts 4514 of the chain link 451 are disposed in the second plugging interface 471.

A limiting member 477 for limiting the position of the cable 44 is further provided in the mounting box 47. The limiting member 477 may usually be set as a plate, column or hook-shaped protrusion mechanism, which can effectively limit the play of the cable 44 in the mounting box 47 to prevent the first connector 441 from disengaging from the cabinet-side electrical connector.

The mounting box 47 is further formed with a mounting area 478 disposed in an enclosed manner, the cover plate 474 is provided with an opening 4741 at a position corresponding to the mounting area 478, the affixation and mounting of the mounting box 47 and the side wall 111 of the compartment 11 is implemented through the opening 4741, and meanwhile moisture in the compartment 11 can be effectively prevented from entering a heat insulating layer of the cabinet 10. A fixing projection 4742 is further formed below the cover plate 474, and used to fix with the inner wall of the compartment 11 or a shelf plate (not shown) additionally provided in the compartment 11 to further enhance the structural stability of the mounting box 47. Furthermore, an accommodating cavity 479 for accommodating an electrical control element is further formed at a position of the mounting box 47 adjacent to the front wall 472, for example, a sensor for sensing whether the drawer-type door body 20 is closed may be fixedly disposed in the accommodating cavity 479.

In addition, a corresponding door body support iron member (not shown) is further fixedly disposed on the rear side of the drawer-type door body 20, and the door body support iron member and the support frame 42 are fixed with each other by screws. In other embodiments of the present invention, the door body support iron member and the support frame 42 may also be designed as one piece, and then fixed with the drawer-type door body 20.

To conclude, the present invention realizes the front-back movement of the drawer-type door body 20 of the refrigerator 100 in the compartment 11 and the stable electrical connection between the drawer-type door body 20 and the cabinet 10 through the wiring mechanism 40. The portion of the cable 44 between the fixed box 46 and the mounting box 47 is completely received in the drag chain 45. The drag chain 45 forms an effective protection for the cable 44, prevents the cable 44 from being subjected to pressing, deformation and damages, and effectively ensures the normal operation of the electrical components on the drawer-type door body 20. In addition, the structural design of the wiring mechanism 40 is more reasonable, easy to install, beautiful and reliable.

It should be understood that although the description is described according to the embodiments, not every embodiment only comprises one independent technical solution, that such a description manner is only for the sake of clarity, that those skilled in the art should take the description as an integral part, and that the technical solutions in the embodiments may be suitably combined to form other embodiments understandable by those skilled in the art.

The detailed descriptions set forth above are merely specific illustrations of feasible embodiments of the present invention, and are not intended to limit the scope of protection of the present invention. All equivalent embodiments or modifications that do not depart from the art spirit of the present invention should fall within the scope of protection of the present invention.

What is claimed is:

1. A refrigerator having a wiring mechanism, comprising a cabinet and a drawer-type door body, the cabinet being formed with a compartment opening forwards, the drawer-type door body being movable in a front-rear direction to open or close the compartment, the drawer-type door body being provided with an electrical component, wherein the wiring mechanism comprises a cable for powering the electrical component, and a drag chain for receiving a part of the cable, one end of the drag chain is fixed to an interior of the compartment, and the other end of the drag chain is connected to the drawer-type door body and moves back and forth along with the drawer-type door body;

wherein the wiring mechanism comprises a fixed frame mounted on a side wall of the compartment, a support frame fixed on the rear side of the drawer-type door body, and a slide rail assembly disposed between the support frame and the fixed frame;

the wiring mechanism further comprises a fixed box mounted on the support frame and a mounting box mounted in the compartment;

the support frame has a mounting portion located below the fixed frame, the fixed box is fixedly mounted on the mounting portion, a rear end of the fixed box is formed with a first plugging interface; the mounting box is located below the fixed frame and disposed with a gap with the support frame, the mounting box is formed with a second plugging interface that opens backward, and the second plugging interface is used to engage with the rear end of the drag chain, the mounting box has a first portion located between the support frame and the side wall and a second portion located below the support frame, the second plugging interface is formed at the rear end of the second portion, both ends of the drag chain are respectively inserted in the first plugging interface and the second plugging interface.

2. The refrigerator according to claim 1, wherein the drag chain is bent and folded in a height direction.

3. The refrigerator according to claim 1, wherein the cable extends into the mounting box, one end of the cable corresponding to the mounting box is provided with a first connector located in the mounting box, and a limiting member for limiting movement of the cable is disposed in the mounting box.

4. The refrigerator according to claim 1, wherein the fixed box is formed with a receiving cavity, and a second connector fixedly received in the receiving cavity is disposed at an end of the cable facing towards the fixed box.

5. The refrigerator according to claim 4, wherein the mounting portion is provided with first catch orifices, and the fixed box is formed with fixed block mated and fixed with the first catch orifices; the fixed blocks are disposed offset from the receiving cavity.

6. The refrigerator according to claim 1, wherein the support frame protrudes to form a support protrusion for limiting the droop of the drag chain.

7. The refrigerator according to claim 1, wherein the slide rail assembly comprises a fixed rail fixed on the fixed frame and a movable rail fixed with the support frame.

8. The refrigerator according to claim 1, wherein the drag chain comprises a plurality of chain links connected in sequence, the chain links each have two clamping plates arranged opposite to each other in a left-right direction, and both ends of each of the clamping plates are respectively formed with a connecting hole and a connecting post; the fixed box comprises a top wall and a bottom wall arranged vertically opposite to each other, a connecting wall connecting the top wall with the bottom wall, and a retaining wall opposite to the connecting wall, the first plugging interface is formed in between the connecting wall and the retaining wall, the connecting wall and the retaining wall are formed with a set of oppositely-disposed plugging bosses, and the plugging bosses each are provided with a plugging hole that mates with the connecting post; the plugging bosses each are further formed with a guide surface extending obliquely.

9. The refrigerator according to claim 1, wherein the drag chain comprises a plurality of chain links connected in sequence, the chain links each have two clamping plates arranged opposite to each other in a left-right direction, and both ends of each of the clamping plates are respectively formed with a connecting hole and a connecting post; the mounting box comprises a front wall and a rear wall which are arranged oppositely, and a cover plate connected between the front wall and the rear wall, the rear wall extends forward to form an cooperation plate disposed opposite to the cover plate, the second plugging interface is formed between the cover plate and the cooperation plate, the cover plate and the cooperation plate are formed with a pair of plugging posts opposite to each other in the left-right direction, and the plugging posts engage with the connecting holes to achieve connection of the drag chain and the mounting box; the plugging posts each are further formed with a guide surface extending obliquely.

10. The refrigerator according to claim 1, wherein the first plugging interface is higher than the second plugging interface.

11. The refrigerator according to claim 1, wherein the first plugging interface and the second plugging interface are respectively formed with a limiting protrusion.

12. The refrigerator according to claim 6, wherein the mounting portion forms a mounting space that is transversely open towards the side of the interior of the compartment, the mounting portion has a top plate and a bottom plate which are disposed vertically opposite, and a side plate connecting the top plate with the bottom plate, the height between the top plate and the bottom plate matches the fixed box, and the support protrusion is formed by folding and extending the lower edge of the side plate toward the interior of the compartment.

13. The refrigerator according to claim 1, wherein the mounting box has a front wall and a rear wall which are arranged oppositely, and a cover plate connected between the front wall and the rear wall, the rear wall extends forward at a position adjacent to the second plugging interface to form an cooperation plate, sides of the cooperation plate and the cover plate towards the second plugging interface protrude towards each other to form a pair of plugging posts, and the plugging posts engage with connecting holes of a chain link at the rearmost end of drag chain.

14. The refrigerator according to claim 13, wherein the mounting box is further formed with a mounting area disposed in an enclosed manner, the cover plate is provided with an opening at a position corresponding to the mounting area, the affixation and mounting of the mounting box and the side wall of the compartment is implemented through the opening.

* * * * *